United States Patent [19]

Simcox

[11] Patent Number: 4,709,689
[45] Date of Patent: Dec. 1, 1987

[54] SOLAR HEAT EXCHANGE SYSTEM
[75] Inventor: Allan W. Simcox, Las Vegas, Nev.
[73] Assignee: Environmental Resources, Inc., Las Vegas, Nev.
[21] Appl. No.: 936,781
[22] Filed: Dec. 2, 1986
[51] Int. Cl.$^4$ .................................................. F24J 2/24
[52] U.S. Cl. ..................................... 126/448; 126/447; 165/171; 165/173
[58] Field of Search ................. 165/171, 173; 126/426, 126/447, 448

[56] References Cited

U.S. PATENT DOCUMENTS 4,060,070 11/1977 Harter .................................. 165/171
4,114,597  9/1978 Erb ....................................... 126/448
4,290,413  9/1981 Goodman et al. ................... 165/173

Primary Examiner—Carroll B. Dority, Jr.
Attorney, Agent, or Firm—Seiler, Quirk & Tratos

[57] ABSTRACT

A solar heat exchange system is fabricated from a manifold and a plurality of elastomeric tubular elements which are longitudinally connected into a mat. A one-piece molded plastic manifold having at least six parallel aligned radially extending nipples is mounted on a cylindrical tubular header. The spacing of the nipples is designed to correspond to the spacing of the tubular elements in the mat. The unit is assembled by applying liquid adhesive to the exterior of the nipples, and sliding the tubular elements of the mat simultaneously over the nipples while the adhesive is still fluid, and allowing the adhesive to set.

18 Claims, 4 Drawing Figures

SOLAR HEAT EXCHANGE SYSTEM

BACKGROUND OF THE INVENTION

This invention relates to a solar fluid heating unit. More particularly, this invention relates to a solar water heater which comprises a molded one-piece manifold having a plurality of connections which is adapted to fit directly on a water pipe. In addition, the invention provides a method of assembling the entire distribution system of a solar water heater which is simple and efficient to conduct, and which can be easily accomplished in the field.

The attraction of using solar energy to heat water for swimming pools and hydrotherapy tubs, in addition to residential and commercial heating, is well known. Traditionally, solar water heaters have been made from metal, usually in the form of elongated metallic tubing which is painted black to aid heat absorption. These units have been generally heavy and rigid in nature, expensive to fabricate and maintain, and subject to damage by freezing. In more recent years, the metallic tubes have been replaced by mats of extruded elastomeric tubes which may be pre-colored black by including carbon black in the extrusion material. An example of such a product is described in Scholl, U.S. Pat. No. 3,648,768. Other patents disclosing systems similar to the one contemplated by the invention are Mac-Cracken, U.S. Pat. No. 3,751,935, and Harter, U.S. Pat. No. 4,060,070. In the Scholl patent, the tubes are prepared for assembly by cutting away the webs and inserting the tubes onto the manifold. Various methods are then used to prevent the tubes from pulling out of the manifold including the use of flared screws, springs with tapered collars, and heat-shrink end caps. These methods all require the use of special tools and require special skills.

While the long tubular mats having a plurality of parallel tubes was a clear advance in the art, these tubes generally must be longitudinally separated from each adjacent tube, at least near the end portions, to attach the mat to a manifold. Typically, tubes in the mat are spaced by webbing in between the tubes, and the webbing is torn manually to loosen the ends of the tube so that they may be connected on-by-one to connecting members attached to a header. This method of assembly is somewhat time consuming, since it requires the separation of each tube, and frequently the shortening of alternate tubes by cutting the ends. In addition, assembly is usually performed in the field, where working conditions may provide a difficult environment for error-free connection of all of the tube members.

The present invention provides a simpler, less expensive, and faster method of constructing a flexible heat exchanger using an extruded tubular array. The assembly can easily be accomplished in the field without fear of failure. The system consists of a tubular header having radial holes bored therethrough, a one-piece molded manifold having a base portion which extends over the radial bore in the header and which has a plurality of radially extending aligned nipples protruding from the manifold base, and an attached tubular mat. The nipples are spaced to mate with the tubes of the extruded mat without separation of the tube ends. In other words, the mat may be forced over the nipples, thus joining all of the tubes on the mat with the manifold in one motion. Assembly of this system is accomplished first by applying adhesive to the base of the manifold and to the header, aligning the manifold over the bores in the header, and applying pressure. After the manifold is affixed to the header, an appropriate liquid adhesive is applied to the exterior surface of the nipples, and the entire end of the mat is aligned with the nipple array and is forced thereon, thereby sliding the tubes over the manifold connectors. The adhesive, while in a liquid state, acts as a lubricant to permit the tubes to slide over the nipples.

Accordingly, it is the object of the present invention to provide a system for assembling a flexible solar heat exchanger which is quickly and easily assembled, and for which the failure rate is virtually nil. It is another object of the invention to provide a solar heat exchange manifold in which all of the tubular connections can be made simultaneously. It is yet another object of the invention to provide a method of assembling a solar heat exchange system in the field which minimizes the number of assembly steps necessary to complete the assembly. These and other objects of the invention will be apparent from the following description of an embodiment thereof.

BRIEF SUMMARY OF THE INVENTION

The invention contemplates the assembly of a header, a one-piece molded manifold having a plurality of tube connection means extending therefrom, and an extruded mat of a plurality of longitudinally attached tubes fabricated from a black elastomer, with the ends of the tubes being fastened over the tube connection means of the manifold. The header is preferably a tubular conduit having a circular cross-section, and the manifold has a base adapted to conform to the outside wall of the header. The manifold is fastened to the header by a suitable adhesive. The tubular mat is attached to the manifold by applying a fluid adhesive to the outside surfaces of the tube connection means, and sliding the tubular elements of the mat simultaneously over the tube connection means, and thereafter allowing the adhesive to set.

BRIEF DESCRIPTION OF THE DRAWINGS

The invention is best understood with reference to the drawings, in which:

FIG. 4 also shows a cut-away of the conduit and manifold.

DETAILED DESCRIPTION OF A PREFERRED EMBODIMENT

Figure 1:
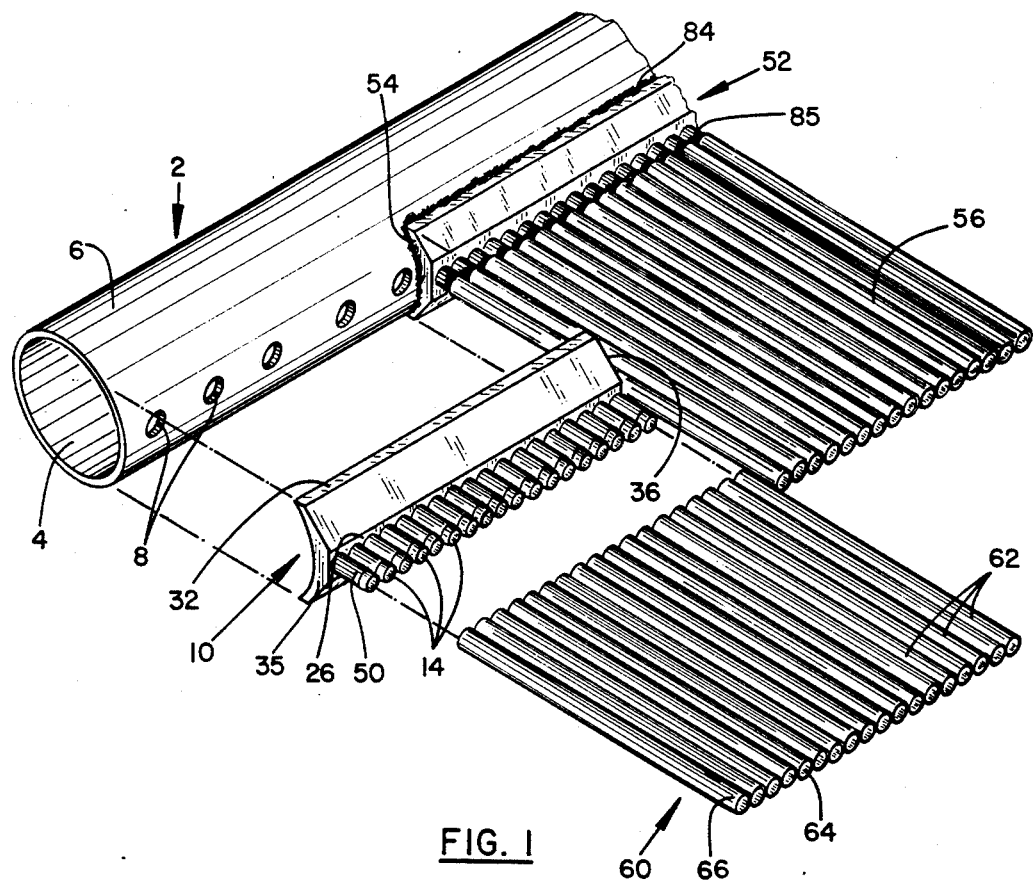
FIG. 1 is a perspective view of a solar heating unit, the left one-half in exploded configuration and the right one-half in assembled configuration.

As shown in the exploded view of FIG. 1, the individual parts of the solar heating system consists of header conduit 2, manifold 10 and mat 60. When the parts are assembled by adhesive 84, they appear as shown in the right half of FIG. 1. In the typical installation, several manifolds are assembled in an aligned configuration onto a single header 2 so that the end surface 36 of one manifold 10 exists in substantially parallel and adjacent configuration to the end surface 54 of the adjacent manifold 52 as shown in FIG. 1.

In operation, cooler feed water is delivered into one end of conduit 2 under a low pressure of typically 10 to 50 psi (see FIG. 1). The other end of the conduit is closed. Water then flows out of conduit 2 through ports 8, into manifold distribution channel or recess 12, into and through nippled orifices 48 and into and through tubes 62 of the mat 60 (See FIG. 2). The mat length is many times greater than its width, typically 10 to 50 feet or more, and is placed on a flat or inclined surface, such as a roof, so that the sun's radiant energy can be absorbed most efficiently by the mat as well as by the manifold and header. The length of the mat and combined width (as determined by the number of adjacently placed manifolds) of the tubular system is determined by the amount of temperature increase desired, the efficiency of the system and the strength and duration of the sun's energy. As the water flows through the mat, it increases in temperature and exits the mat into another arrangement of aligned, abutted manifolds mounted on a discharge conduit (not shown). Once inside the discharge conduit the heated water is then directed to the desired location such as a pool or storage tank.

More specifically, the header conduit 2 shown in FIG. 1 is circular in cross-section with inner wall surface 4 and outer wall surface 6. The header contains a plurality of longitudinally aligned circular radial ports 8 formed in the wall of the conduit 2 with the axis of each port at right angles to the axis of the header. If desired, a simple elongated aperture can be used in place of the aligned bores, as long as sufficient flow of water takes place into the manifold. While each manifold 10 assembled onto the conduit 2 is shown as covering five separate feed ports, the number, spacing and shape of the ports can vary. However, all ports 8 intended for a single manifold 10 must be arranged in such a manner that they are all subtended by the manifold distribution channel 12 shown in FIG. 2 and FIG. 3.

Figure 2:
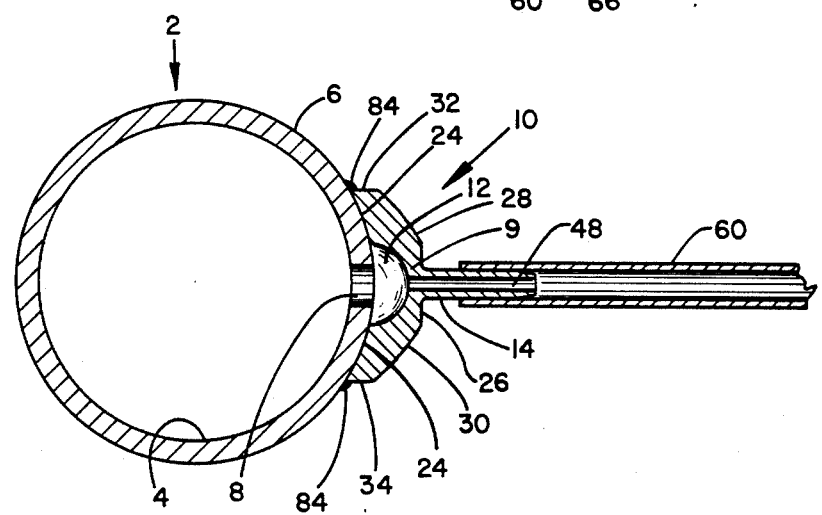
FIG. 2 is a cross-sectional view of an assembled conduit and manifold with a mat partially assembled onto the manifold.
Figure 3:
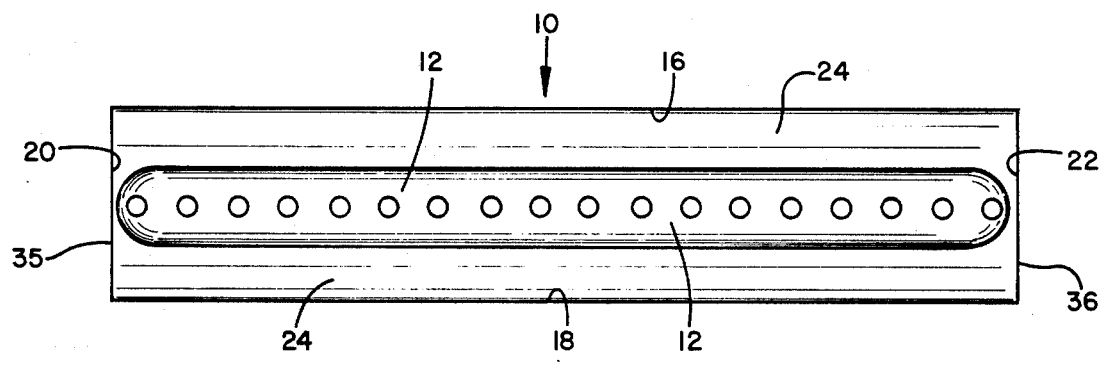
FIG. 3 is an elevation of the rear of the manifold.

Manifold 10, shown in FIG. 1 is a one-piece molded plastic member, and is located between the feed conduit 2 and mat 60. It comprises a plurality of aligned tube-connecting means or nipples 14 extending outwardly from the outer front surface 26 of base portion 9 of the manifold. A recessed distribution channel 12 is formed into manifold rear surface 24 of the base, when viewed from the rear or conduit side as in FIG. 3, has a shape that is generally rectangular. The transverse cross-sectional shape of the distribution channel is arcuate as shown in FIG. 2. The channel importantly communicates with all of the nipples, permitting flow from the header through all of the nipples. The manifold, when viewed from the rear or conduit side as in FIG. 3, is rectangular in shape with two parallel top and bottom edges 16 and 18, and two parallel side edges 20 and 22. The rear surface 24 of the manifold, as shown in the cross-sectional view of FIG. 2, has the same shape as the outer surface 6 of the conduit 2 in that it conforms thereto creating a gap-free interface when assembled. In the case of a circular conduit of 2" outside diameter, the radius of the curved rear manifold surface 24 as seen in FIG. 2, would be equal to 1". The manifold, when assembled, has seven exposed surfaces: 26, 28, 30, 32, and 34, all of which extend the length of the manifold, and ends 35 and 36.

When viewed from the front or mat side, as shown in FIG. 1, the flat surface 26 of manifold 10 from which nipples 14 extend is rectangular in shape. Located immediately adjacent to either side of flat surface 26 are slightly convex surfaces 28 and 30 which extend outwardly and rearwardly from front surface 26 toward the rear of the manifold.

Flat parallel rectangular edge surfaces 32 and 34, shown in FIG. 2, extend rearwardly from curved surfaces 28 and 30 to the rear of the manifold. End surface 35, shown in FIG. 1 and FIG. 2, and opposing end surface 36 are oriented in parallel configuration on either end of the manifold and are both at right angles to flat surface 26.

Nipples 14 are located in aligned parallel configuration and are equally spaced from both curved side surfaces 28 and 30 of the base. Each nipple extends outwardly from flat surface 26 and terminates in a chamfered end which acts as a guide to slide tubes from the mat on to the tube-connecting members. Each nipple is a short cylindrical tube having an outer wall surface 50 and an inner wall surface 46 defining an internal circular channel 48 extending from the manifold distribution chamber 12 to the end of the nipple. Preferably, the center-to-center spacing between adjacent nipples is equal to the outside diameter of one of the tubes on the mat, although different spacing dimensions can be used if the tubes are separated by webs. Of course, the center-to-center spacing of the nipples should equal the center-to-center spacing of the tubular elements of the mat. Each manifold has a plurality of connecting nipples; at least six is preferred, with from about 12 to about 24 being especially preferred. Greater numbers can be somewhat clumsy to install in the field, and manifolds having smaller numbers of nipples do not obtain the desired amount of efficiency in installation.

As shown in FIG. 1, each end nipple on either end of the manifold is offset from the respective end surfaces 35 and 36 so that the distance between the nipple outside surface 50 and the end surface 35 and 36 is equal to one-half of the center-to-center tube spacing, and is preferably equal to one-half of the outside diameter of a tube. When the mat 60 is installed on the manifold 10, the mat does not extend beyond the end surfaces 35 or 36 of the manifold. Multiple manifolds can therefore be assembled along a single conduit 2 by aligning the manifolds in end-to-end relationships, with adjacent ends 35 and 54 abutting each other (see FIG. 1).

Mat 60 as shown in FIG. 1 consists of a plurality of elongate cylindrical tubes 62 each containing an inner wall 64 and an outer wall 66. The mat 60 is formed so that adjacent tubes 62 abut each other along their length with center-to-center spacing of adjacent tubes corresponding to the center-to-center spacing of adjacent nipple 14 on the manifold 10, and being substantially equal to the outside diameter of one of the tubes. As used herein the term "substantially" is intended to include slight spaces or webs of e.g. up to about 0.03" between adjacent tubes; this enables separation of tube ends if necessary without tearing the tub. The lack of webbing between the tubes as shown in the prior art enables a very efficient, "fully wetted" surface; i.e., it provides for the maximum exposure of water carried by the tubes to solar radiation (since water does not travel through the prior art "webs"). The ends of the tubes on the mat are located in a common plane perpendicular to the tube axes. The inside diameter is chosen to provide a frictional fit between the tube and the nipple 14. The outside diameter of each tube is dependent on the wall thickness of the tube which is approximately ½ the distance between outside surfaces 50 of adjacent nipples. Each mat consists of at least six tubes, preferably from about twelve to about twenty four tubes.

Typically, the manifold of the invention has the following approximate dimensions, although other similar configurations and size may obviously be used if desired. The manifold is about 6" long and 1¼" wide, and the base is about ¼" thick at its thickest point. The nipples are about ⅜" in length, with an inside diameter of 0.125" and an outside diameter of 0.203". The tubes on the mat have normal inside diameters of about 3/16" and outside diameters of about 5/16".

Construction of the solar heating system of the invention is an important part of the invention, and can be done either in the shop or on the site; preferably, assembly is done on the site since it can be done very quickly and easily, and can be tailored to the particular installation right at the site. Generally, preparation of the main-line feed and discharge headers is done in the shop by cutting the conduits to the appropriate sizes and drilling the longitudinally aligned radial bores over which the manifolds are mounted. Attachment of the manifolds by means of adhesive may also be done in the shop. Attachment of the manifold 10 to the conduit 2 is accomplished by applying a liquid adhesive 84 to the manifold/conduit interface 24. The manifold is positioned such that the recess or channel 12 is positioned over the aligned bores in the wall of the feed conduit, with the axes of the nipple orifices 48 on the same radial plane as the axes of ports 8 in the conduit. Adjacent manifolds are mounted in similar manner, each aligning with its neighbor manifolds.

Figure 4:
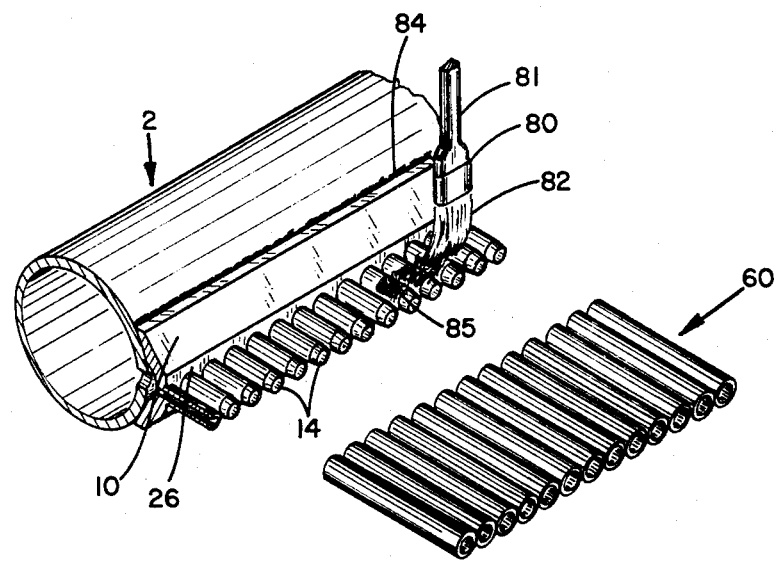
FIG. 4 is a perspective view showing the application of bonding agent just prior to mat assembly.

The mat 60 is generally always assembled onto the manifolds in the field. As shown in FIG. 4, a suitable adhesive 85 is applied by gripping the handle 81 of brush 80 and moving the bristles 82 of the brush along the exterior surface of the nipples on the manifold. While the adhesive is still wet, the tubular mat is aligned so that the axis of each nipple orifice 48 corresponds to the axis of each mat tube 62. The mat 60 then slides as a unit onto the manifold nipples, with the adhesive serving as a lubricant, until the mat abuts the front surface 26 of the manifold. In this manner, all of the tubes are attached substantially simultaneously. The term "substantially simultaneously" is intended to include all operations in which the mat is placed on the manifold as a unit, i.e., without separating the tubes individually and placing each tube separately on the manifold. The mat may be slightly angled in a horizontal plane, thus resulting in tubes on one end being placed on the manifold first by a very short length of time. Generally, a short cure time is necessary to obtain full strength of the bond. After a conduit has been assembled with a plurality of aligned manifold members providing the desired number of nipples, mats of tubes are simply placed one after the other on the manifolds in the manner described.

The conduits are preferably fabricated from ABS, and the manifolds are also molded from high-impact ABS. The mats comprising the flexible tubes are made from elastomers of EPDM (ethylene propylene diene monomer), and the tubes are attached to the conduit by means of a commercially available adhesive. An example of an appropriate adhesive for bonding EPDM elastomers is B. F. Goodrich adhesive A1372-B. A suitable adhesive for attaching the ABS conduit to the manifold is Weld-On No. 773, black color, fast set, manufactured by Industrial Polychemical Service of Gardena, Calif.

Minor modifications to the assembly and method of the invention will be apparent to those with skill in the art, and are considered to be within the spirit and scope of the invention. Accordingly, the invention should not be considered limited by the foregoing description of a preferred embodiment, but should be defined only by the following claims.

I claim:

1. In combination
   a header comprising a conduit having an exterior wall,
   at least one aperture in the header wall,
   a one-piece molded manifold having a base portion and a plurality of aligned tube-connecting means extending therefrom,
   channel means in a rear portion of the manifold communicating with the tube-connecting means,
   the base portion having a rear surface adapted to conform to the exterior wall of the header and being affixed thereto such that the channel means communicates with the bore means, and
   a plurality of aligned, longitudinally connected tubular elements attached to the tube-connecting means.

2. The combination of claim 1 wherein the tube-connecting means of the manifold comprise at least six nipples extending radially from the header and aligned in parallel configuration.

3. The combination of claim 1 wherein the tube-connecting means comprises from about twelve to about twenty four nipples extending radially from the header and aligned in parallel configuration.

4. The combination of claim 2 wherein the nipples also comprise guide means at a forward end thereof for aligning the tubular elements when the tubular elements are slideably engaged therewith.

5. The combination of claim 1 wherein the header comprises a cylindrical tubular conduit having an exterior wall with a substantially circular cross-section, and the rear surface of the base portion of the manifold has a rear surface of at least partially circular configuration adapted to mate with the exterior wall of the header.

6. The combination of claim 1 wherein the header and the manifold are fabricated from ABS polymer, and the manifold is bonded to the header by means of a liquid adhesive.

7. The combination of claim 1 wherein the header also comprises a plurality of longitudinally aligned bores in the header wall, and wherein the bores are oriented in registry with the channel means of the manifold.

8. The combination of claim 1 also comprising a second manifold aligned longitudinally with end portions of each manifold being aligned in immediately adjacent relationship.

9. The combination of claim 8 wherein the first and second manifolds are identical, and wherein the tube connecting means of each manifold comprises at least six nipples extending radially from base portions of each manifold, said nipples of both manifolds being aligned in linear orientation, and the spacings between the axes of all of the aligned nipples are substantially equal.

10. The combination of claim 1 wherein the tube connecting means comprise a plurality of radially extending nipples, and wherein the manifold consists of an elongate member having substantially flat opposing end surfaces, and wherein the longitudinal distance between the axis of the nipple closest to the end surface and the end surface is approximately equal to ½ of the distance between the axes of the remaining adjacent nipples.

11. The combination of claim 1 wherein the center-to-center spacing between adjacent tube connecting means is uniform and is approximately equal to the outside diameter of a tubular element.

12. The combination of claim 1 wherein end surfaces of each of the tubular elements are located in a common plane perpendicular to the axes of the tubular elements.

13. A method of assembling a solar heat exchange system comprising the steps of forming at least one aperture in a wall of a tubular header, bonding a one-piece manifold to the header, the manifold comprising a base portion having a plurality of aligned hollow nipples extending forwardly therefrom, the base portion having a rear surface adapted to conform to the header wall and containing a longitudinal channel communicating with the nipples, the channel being oriented over the aperture in the header wall, applying a hardenable liquid adhesive to all of the nipples on the manifold, and attaching a mat having a plurality of parallel tubular elements to the manifold by sliding ends of all of the tubular elements of the mat substantially simultaneously over the nipples.

14. The method of claim 13 wherein the tubular elements of the mat are longitudinally connected to adjacent tubular elements, and the tubular elements have end surfaces located in a common plane perpendicular to the axes of the tubular elements.

15. The method of claim 13 wherein a plurality of axially aligned radial apertures are bored in the tubular header wall, and the manifold is placed on the header such that the channel is oriented over several of the apertures.

16. The method of claim 13 wherein the manifold has at least six nipples aligned in parallel orientation on the manifold.

17. The method of claim 13 wherein the manifold comprises from twelve to about twenty four nipples extending in parallel orientation from the manifold.

18. The method of claim 13 wherein the manifold comprises at least six nipples extending forwardly therefrom in parallel orientation, and the mat comprises a number of tubular elements equal to the number of nipples on the manifold.

* * * * *

UNITED STATES PATENT AND TRADEMARK OFFICE
CERTIFICATE OF CORRECTION

PATENT NO. : 4,709,689
DATED : Dec. 1, 1987
INVENTOR(S) : Allan W. Simcox

It is certified that error appears in the above—identified patent and that said Letters Patent is hereby corrected as shown below:

Column 6, line 18: Delete "bore means" and insert -- aperture --.

Signed and Sealed this

Nineteenth Day of July, 1988

Attest:

DONALD J. QUIGG

Attesting Officer          Commissioner of Patents and Trademarks